(12) United States Patent
Jeon et al.

(10) Patent No.: US 8,797,145 B2
(45) Date of Patent: Aug. 5, 2014

(54) RFID SYSTEM AND COMMUNICATION METHOD PERFORMED BY THE SAME

(71) Applicant: Intellectual Discovery Co., Ltd., Seoul (KR)

(72) Inventors: Ki-yong Jeon, Changwon (KR); Chang-seok Yoon, Seoul (KR); Sung-ho Cho, Seoul (KR)

(73) Assignee: Intellectual Discovery Co., Ltd., Seoul (KR)

( * ) Notice: Subject to any disclaimer, the term of this patent is extended or adjusted under 35 U.S.C. 154(b) by 0 days.

(21) Appl. No.: 13/856,551

(22) Filed: Apr. 4, 2013

(65) Prior Publication Data

US 2013/0234829 A1    Sep. 12, 2013

Related U.S. Application Data

(63) Continuation of application No. 12/362,553, filed on Jan. 3, 2009, now abandoned.

(30) Foreign Application Priority Data

Jan. 31, 2008    (KR) .................... 10-2008-0010367

(51) Int. Cl.
*H04Q 5/22*     (2006.01)
*G08B 13/14*    (2006.01)
*G06K 7/10*     (2006.01)
*H04B 5/00*     (2006.01)

(52) U.S. Cl.
CPC .......... G06K 7/10297 (2013.01); H04B 5/0062 (2013.01)
USPC ..... 340/10.1; 340/10.3; 340/10.33; 340/10.4; 340/10.52; 340/10.6; 340/572.1; 340/572.7; 235/440; 235/451

(58) Field of Classification Search
CPC .............. G06K 7/0004; G06K 7/0008; G06K 2007/10485; G06K 2007/10495; G06K 2215/002; G06K 2215/004; G06K 7/10297; G06K 7/10336; G06K 19/07; G06K 19/072; G06K 19/07767; G06K 19/0716; G06K 19/0724; G06K 19/0701; G06K 7/0095; G06K 2007/00; G06K 1/00; G06K 7/00; H04B 5/0062; H04B 5/0068; H04B 5/02; H04B 14/023; H04B 5/0037; H04B 5/0056; H04B 5/0031; H04B 1/662; H04B 7/005; H04B 1/59
USPC ............... 340/572.1, 572.4, 572.5, 988, 10.1, 340/10.2, 10.3, 10.31, 10.4, 10.41, 10.42, 340/539, 10.5, 5.61, 5.72, 539.21, 10.33; 455/101, 552, 422, 435, 436, 255, 130, 455/230, 552.1, 550.1, 85, 86, 41.2, 91, 455/141, 73, 75, 76, 131, 132, 102, 180.1; 375/219, 261, 298, 316, 283, 281, 315; 342/195, 51

See application file for complete search history.

(56) References Cited

U.S. PATENT DOCUMENTS 6,784,789 B2 *  8/2004  Eroglu et al. ................ 340/10.6
7,388,468 B2 *  6/2008  Diorio et al. ................ 340/10.4

(Continued)

FOREIGN PATENT DOCUMENTS

KR   10-2007-0025076   *  3/2007   ............ G06K 19/07

OTHER PUBLICATIONS

KPA (Korean Patent Abstracts)—Application No. 1020070025076 Application Date Mar. 14, 2007.*

*Primary Examiner* — Nabil Syed
*Assistant Examiner* — Mirza Alam
(74) *Attorney, Agent, or Firm* — Sughrue Mion, PLLC

(57) ABSTRACT

Provided is an RFID system and method for maintaining a constant strength of a signal transmitted from an RFID tag to an RFID reader, regardless of a distance between the reader and tag. The RFID signal strength measuring reader measures a signal strength received from the RFID tag, creates control information used to set an amplification amount of the RFID tag by using a value of the measured strength to include the control information in an output signal, and sends the output signal to the RFID tag. The RFID tag, if the signal sent from the RFID reader is received, extracts internal information from the received signal, sends the information to the RFID reader as an output signal, and extracts the control information included in the signal sent from the RFID reader to adjust a strength of the output signal according to a value of the control information.

14 Claims, 6 Drawing Sheets

(56) References Cited

U.S. PATENT DOCUMENTS

| | | | |
|---|---|---|---|
| 2004/0085191 A1* | 5/2004 | Horwitz et al. | 340/10.3 |
| 2005/0156709 A1* | 7/2005 | Gilbert et al. | 340/10.1 |
| 2005/0253688 A1* | 11/2005 | Fukuda | 340/10.4 |
| 2006/0082457 A1* | 4/2006 | Artem et al. | 340/572.1 |
| 2006/0113385 A1* | 6/2006 | Chan et al. | 235/440 |
| 2006/0158317 A1* | 7/2006 | Kuriki et al. | 340/10.52 |
| 2006/0186995 A1* | 8/2006 | Wu et al. | 340/10.1 |
| 2007/0247286 A1* | 10/2007 | Drago et al. | 340/10.4 |
| 2008/0061943 A1* | 3/2008 | Wu et al. | 340/10.33 |
| 2008/0224870 A1* | 9/2008 | Yeo et al. | 340/572.1 |

\* cited by examiner

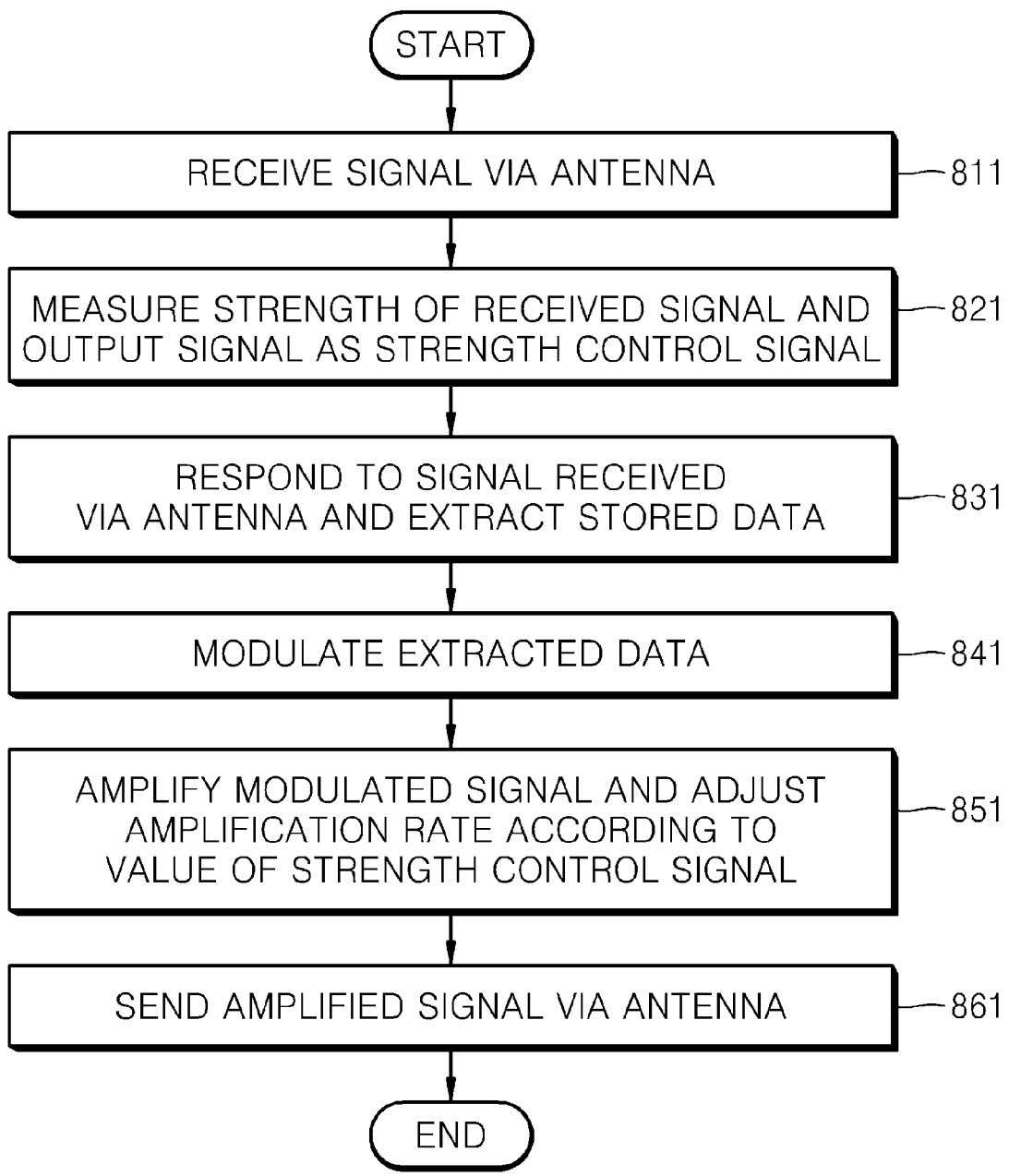

RFID SYSTEM AND COMMUNICATION METHOD PERFORMED BY THE SAME

CROSS-REFERENCE TO RELATED PATENT APPLICATION

This Application is a continuation of parent application Ser. No. 12/362,553, filed Jan. 30, 2009. The parent application is herein incorporated by reference. This application also claims the benefit of Korean Patent Application No. 10-2008-0010367, filed on Jan. 31, 2008, in the Korean Intellectual Property Office, the disclosure of which is incorporated herein in its entirety by reference.

BACKGROUND

Disclosed herein is a radio frequency identification (RFID) system that comprises an RFID reader and an RFID tag and performs mutual communication, and a communication method performed by the RFID system.

Radio frequency identification (RFID) technology is a radio frequency recognition technology, which identifies an object by using a radio frequency ranging, that is a radio frequency band, from MHz to GHz, without contacting the object. A wide radio frequency band makes it possible to use various types of frequencies and utilize different frequencies according to particular applications.

An RFID system using an RFID technology can be used to obtain information about a product wirelessly. For this, the RFID system includes an RFID tag that includes the information about the product and is attached to the product and an RFID reader that communicates with the RFID tag wirelessly and extracts information about the product.

In more detail, the RFID tag includes an antenna and an RFID chip, stores and renews the information sent from the RFID reader in the RFID chip through the antenna, and sends the information stored in the RFID chip to the RFID reader through the antenna. The RFID tag modulates a wireless signal sent from the antenna of the RFID reader according to the information stored in the RFID chip and reflects the modulated wireless signal. The RFID reader reads the information stored in the RFID chip from the reflected wireless signal.

RFID tags are classified into active type RFID tags and passive type RFID tags. An active RFID tag is supplied with power from outside, and thus it uses long distance communication. On the other hand, a passive RFID tag is supplied with power from a signal sent from an RFID reader, and outputs a signal that significantly changes according to a distance between the passive RFID tag and the RFID reader.

When the passive RFID tag is nearby, a high-power carrier wave is transmitted from the RFID reader to the passive RFID tag, and a modulated signal is transmitted from the passive RFID tag to the nearby RFID. On the other hand, when the passive RFID tag is far away, a low-power carrier wave is transmitted from the RFID reader to the passive RFID tag, and the modulated signal is transmitted from the passive RFID tag to the far-away RFID. That is, a signal transmitted from the passive RFID tag to the RFID reader has a power that is inversely proportional to the distance between the passive RFID tag and the RFID reader.

Also, since a passive type RFID reader aims at a long-distance recognition, receiving a signal that exceeds a certain level, e.g., from a nearby RFID tag, may cause a problem with a recognition rate of an RFID tag signal. On an experimental basis, a short-distance recognition was measured to be smaller than an appropriate distance recognition. Accordingly, the RFID reader must maintain strength of a RFID tag signal at a certain level in order to increase a recognition rate with respect to information stored in the RFID tag.

SUMMARY

Various embodiments of the invention provide an RFID system for maintaining a constant strength of a signal transmitted from an RFID tag to an RFID reader, regardless of a distance between the RFID reader and the RFID tag.

They also provide a communication method performed by an RFID system for maintaining a constant strength of a signal transmitted from an RFID tag to an RFID reader, regardless of a distance between the RFID reader and the RFID tag.

According to an embodiment of the invention, there is provided an RFID system comprising: an RFID reader measuring a strength of a signal sent from an RFID tag, creating control information which sets an amplification amount of the RFID tag by using the measured value to include the control information in an output signal, and sending the output signal to the RFID tag; and an RFID tag extracting internal information when the signal sent from the RFID reader is received, and sending the information to the RFID reader as an output signal, and at this time, extracting the control information comprised in the signal sent from the RFID reader to adjust strength of the output signal according to the control information.

According to another embodiment of the invention, there is provided an RFID tag that communicates with an RFID reader wirelessly, the RFID tag includes: a signal strength measuring unit receiving a signal from the RFID reader and measuring a strength of the received signal; and an output unit receiving a signal which is output from the signal strength measuring unit, adjusting the strength of an RFID tag signal, and sending the RFID tag signal to the RFID reader.

According to another embodiment of the invention, there is provided an RFID tag that communicates with an RFID reader, the RFID tag includes: an antenna receiving and sending a signal from and to the RFID reader; a signal strength measuring unit receiving the signal from the RFID reader and measuring a strength of the received signal; a variable amplification unit amplifying an input signal, receiving an output signal of the signal strength measuring unit, adjusting an amplification amount of the input signal and outputting the adjusted signal; and a circulator connected to the variable amplification unit, the signal strength measuring unit, and the antenna, transmitting the signal which is output from the variable amplification unit to the antenna, and sending the signal which is output via the antenna to the signal strength measuring unit.

According to another embodiment of the invention, there is provided a communication method of an RFID system comprising an RFID reader and an RFID tag, the method comprising: when a signal sent from the RFID tag is received, measuring a strength of the received signal by the RFID reader; creating control information which sets an amplification amount of an output signal of the RFID tag by using the measured value by the RFID reader; and sending a signal comprising the control information to the RFID tag by the RFID reader.

According to another embodiment of the invention, there is provided a communication method of an RFID system comprising an RFID reader and an RFID tag, the method comprising: when a signal sent from the RFID reader is received, checking whether control information which set an amplification amount of the RFID tag is comprised or not by the RFID tag; when the control information is so comprised, extracting the control information and information stored in the RFID tag to modulate them by the RFID tag; and amplifying the modulated signal, and at this time, outputting the modulated signal by adjusting an amplification amount of the modulated signal according to the control information by the RFID tag.

According to another embodiment of the invention, there is provided a method of operating an RFID tag that communicates with an RFID reader, the method includes: measuring a strength of a signal sent from the RFID reader and outputting the signal as a control signal; extracting information stored in the RFID tag; modulating a signal of the extracted information; and adjusting strength of the modulated signal according to the control signal and sending the modulated signal to the RFID reader.

BRIEF DESCRIPTION OF THE DRAWINGS

The above and other features and advantages of the invention will become more apparent by describing in detail exemplary embodiments thereof with reference to the attached drawings in which:

FIG. 8 is a flowchart of a method of operating an RFID tag according to an embodiment of the invention.

DETAILED DESCRIPTION OF THE EMBODIMENTS

Figure 1:
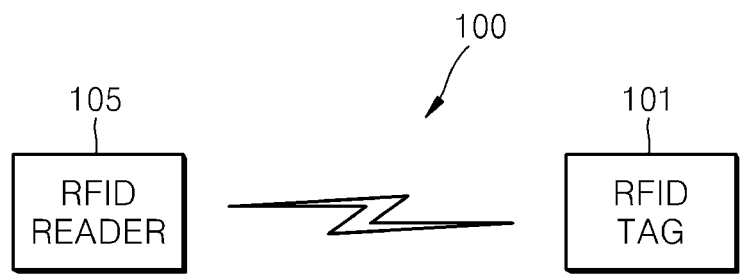
FIG. 1 is a block diagram of an RFID system according to an embodiment of the invention.

Hereinafter, the invention will be described in detail by explaining exemplary embodiments of the invention with reference to the attached drawings. Like reference numerals in the drawings denote like elements.

FIG. 1 is a block diagram of an RFID system 100 according to an embodiment of the invention.

Referring to FIG. 1, the RFID system 100 includes an RFID reader 105 and an RFID tag 101. The RFID reader 105 and the RFID tag 101 communicate with each other wirelessly.

The RFID reader 105 sends a signal to the RFID tag 101 in order to extract information stored in the RFID tag 101. The RFID reader 105 measures a strength of a signal received from the RFID tag 101, and creates control information by using the measured value to include the control information in an output signal. The control information includes a value which sets an amplification amount of the signal sent from the RFID tag 101 so that strength of the signal received by the RFID reader 105 from the RFID tag 101 becomes constant, regardless of a distance between the RFID reader 105 and the RFID tag 101.

The strength ($P_{tagrx}$) of the signal transmitted from the RFID reader 105 to the RFID tag 101 is obtained by Equation 1 below, $$P_{tagrx} = \frac{P_{readertx}}{4\pi R^2} \qquad 1)$$

wherein, $P_{readertx}$ denotes the strength of the signal sent from the RFID reader 105, and R denotes the distance between the RFID reader 105 and the RFID tag 101.

In Equation 1, the strength of the signal transmitted from the RFID reader 105 to the RFID tag 101 is inversely proportional to the square of the distance between the RFID reader 105 and the RFID tag 101.

The strength ($P_{readerrx}$) of the signal transmitted from the RFID tag 101 to the RFID reader 105 is obtained by Equation 2 below, $$P_{readerrx} = \frac{P_{readertx}}{(4\pi R^2)^2} \qquad 2)$$

wherein, it is assumed that power ($P_{readerrx}$) supplied to the RFID reader 105 is obtained by reflecting power supplied from the RFID reader 105 to the RFID tag 101 by 100%, and R denotes the distance between the RFID reader 105 and the RFID tag 101.

In Equation 2, the strength of the signal transmitted from the RFID tag 101 to the RFID reader 105 is inversely proportional to the fourth power of the distance between the RFID tag 101 and the RFID reader 105. For example, if the strength of the signal transmitted from the RFID reader 105 to the RFID tag 101 is 30 [dBm], the strength of the signal transmitted from the RFID tag 101 to the RFID reader 105 is significantly reduced to −60 [dBm].

The RFID reader 105 creates the control information by using the value obtained by Equation 2 to include the control information in the signal output by the RFID reader 105. In more detail, if the strength of the signal which is input to the RFID reader 105 is greater than a certain value, since the RFID reader 105 and the RFID tag 101 are a short distance from each other, the strength of the signal transmitted from the RFID tag 101 must be reduced. Alternately, if the strength of the signal which is input to the RFID tag 101 is lower than the certain value, since the RFID reader 105 and the RFID tag 101 are a long distance from each other, the strength of the signal transmitted from the RFID tag 101 must be increased. The certain value may be set according to an operating rule or by a user at his or her discretion. An example of the control information created using the above principle is shown in Table 1 below.

TABLE 1

Adjustment Based on Distance

| Distance between RFID reader and RFID tag | Measured value of signal received by RFID reader | Control information included in signal output | Amplification amount of RFID tag |
|---|---|---|---|
| Short | 9-15 | 0001-0111 | Decreased |
| Appropriate | 8 | 1000 | Maintained at standard level |
| Long | 1-7 | 1001-1111 | Increased |

As shown in Table 1 above, if the RFID reader 105 and the RFID tag 101 are an appropriate distance from each other, a value of the control information is set to "1000", and thus the signal transmitted from the RFID tag 101 to the RFID reader 105 maintains a standard amplification amount. If the RFID reader 105 and the RFID tag 101 are a short distance from each other, the value of the control information is set to "0001-0111", and thus an amplification amount of the signal transmitted from the RFID tag 101 to the RFID reader 105 is reduced below the standard amplification amount. If the RFID reader 105 and the RFID tag 101 are a long distance from each other, the value of the control information is set to "1001-1111", and thus the amplification amount of the signal transmitted from the RFID tag 101 to the RFID reader 105 is increased above the standard amplification amount. In this regard, when the value of the control information is between "0111" and "0001", the RFID tag 101 may be set to more greatly reduce the amplification amount of the signal transmitted to the RFID reader 105 as the value is smaller. When the value of the control information is between "1001" and "1111", the RFID tag 101 may be set to more greatly increase the amplification amount of the signal transmitted to the RFID reader 105, as the value is greater.

In Table 1, although the value of the control information uses four bits using a binary code, the invention is not limited thereto. The value of the control information may use more or less than four bits, or use another code besides the binary code. Also, if the value of the control information is small, the amplification amount of the RFID tag 101 may be set to be reduced. If the control information value is great, the amplification amount of the RFID tag 101 may be set to be increased.

The RFID tag 101 receives the signal from the RFID reader 105, extracts information stored therein, and sends the information to the RFID reader 105. At this time, the RFID tag 101 adjusts an amplification amount of an output signal according to the control information included in the signal transmitted from the RFID reader 105.

The RFID tag 101 may be a passive type RFID tag that operates with power supplied from the signal transmitted from the RFID reader 105. The RFID tag 101 may also use a backscattering method in order to perform effective communication at low cost.

The backscattering method modulates a signal by using a carrier wave signal transmitted from the RFID reader 105 without including an internal oscillator in the RFID tag 101. The backscattering method enables amplitude shift key (ASK) and phase shift key (PSK) modulations through three types of transmission phenomenon of absorption, specular reflection, and retro-reflection.

If a carrier wave input from an antenna of the RFID tag 101 terminates due to an impedance load such as a transmission line, a signal is not reflected and is absorbed. When a terminal of the transmission line is opened, a signal having the same phase is reflected. When the transmission line is short-circuited, a signal having an inversed phase is reflected. Although all this method needs is a simple and low-cost circuit, since it uses a carrier wave sent from the RFID reader 10, the strength of a signal significantly changes according to the distance between the RFID reader 105 and the RFID tag 101. If the strength of the signal changes, a recognition rate of a signal received by the RFID reader 105 is reduced. To address this problem, an amplification amount of the RFID tag 101 is adjusted according to the distance between the RFID reader 105 and the RFID tag 101 in order to maintain a constant strength of the signal received by the RFID reader 105.

The RFID tag 101 is attached to an object and stores an identification (ID) of the object. The RFID reader 105 identifies the RFID tag 101, and writes or reads additional information to or from the RFID tag 101.

The RFID reader 105 and the RFID tag 101 uses various international standards of communication, such as those for data encoding, modulation, collision prevention, data decoding, and demodulation. At present, an EPC Class 1 Generation 2[3] has been registered in ISO/IEC, and its range of use has been internationally increased.

The RFID tag 101 of the current embodiment is based on the operation of the RFID system 100 according to the EPC Class 1 Generation 2[3] standard. However, the invention is not limited thereto, and the RFID tag 101 may be operated by using various international standards of communication, such as data encoding, modulation, collision prevention, data decoding, demodulation, etc.

Figure 2:
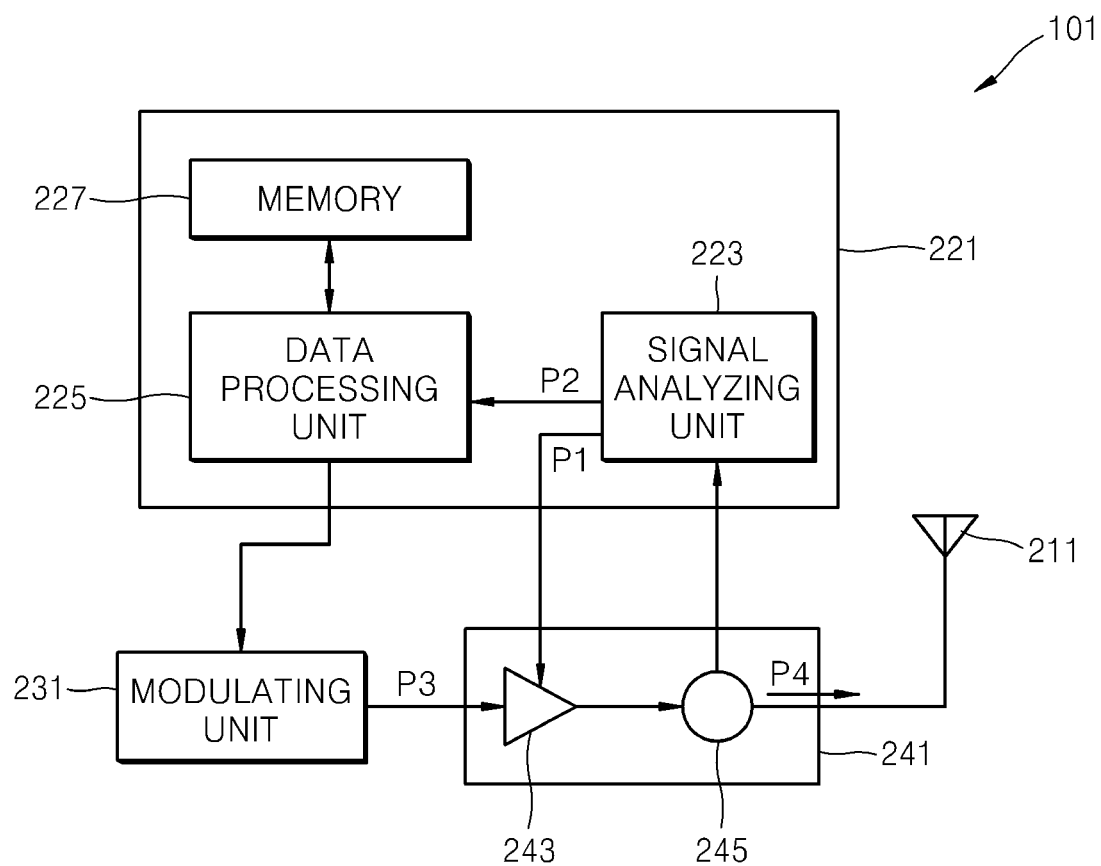
FIG. 2 is a block diagram of an RFID tag of FIG. 1 according to an embodiment of the invention.

FIG. 2 is a block diagram of the RFID tag 101 of FIG. 1 according to an embodiment of the invention. Referring to FIG. 2, the RFID tag 101 includes an antenna 211, a logic unit 221, a modulating unit 231, and an output unit 241.

The antenna 211 receives a signal sent from the RFID reader 105 (see FIG. 1) wirelessly, sends the signal to the output unit 241, and transmits a signal P4 sent from the output unit 241 to the RFID reader 105 (see FIG. 1) wirelessly.

The logic unit 221 is connected to the antenna 211, the modulating unit 231, and the output unit 241. The logic unit 221 inputs a signal sent from the output unit 241, outputs output signals P1 and P2, and sends the output signals P1 and P2 to the output unit 241 and the modulating unit 231, respectively. The logic unit 221 includes a signal analyzing unit 223, a data processing unit 225, and a memory 227.

The signal analyzing unit 223 receives a signal which is input from the antenna 211 and extracts control information included in the signal. Then, the signal analyzing unit 223 analyzes the control information, outputs an analysis result as an amplification control signal P1, and sends the amplification control signal P1 to the output unit 241. The signal sent from the antenna 211 includes control information and general information. The signal analyzing unit 223 does not analyze the general information and outputs the general information as an output signal P2, and sends the output signal P2 to the data processing unit 225.

The data processing unit 225 receives the output signal P2 of the signal analyzing unit 223, extracts information stored in the memory 227, and transmits the information to the modulating unit 231.

The memory 227 stores data. The data includes specific information about, for example, nationality of a product to which the RFID tag 101 is attached, origin, price, manufacturing date, expiration date thereof, etc.

The modulating unit 231 is connected to the logic unit 221 and the output unit 241. The modulating unit 231 receives a signal which is output from the logic unit 221, modulates the signal as a modulated signal P3, and transmits the modulated signal P3 to the output unit 241. The modulating unit 231 may use a frequency modulation 0 (FM0) method in order to modulate the signal P3. The FM0 method, which is defined by an ISO/IEC 18000-6 standard, is a common modulation method used in a response signal transmitted from the RFID tag 101 to the RFID reader 105 (see FIG. 1). The FM0 method has three types of A, B, and C. The types A and B must use only FM0, and the type C uses the FM0 or a miller subcarrier. The FM0 is easy to use because data and waveform of the FM0 are simpler than those of the miller subcarrier.

The output unit 241 inputs the amplification control signal P1 which is output from the logic unit 221 and the output signal P3 of the modulating unit 231, amplifies the output signal P3 of the modulating unit 231 according to the amplification control signal P1, and transmits the amplified signal P4 to the antenna 211. That is, the output unit 241 adjusts an amplification amount of the output signal P3 of the modulating unit 231 according to a value of the amplification control signal P1. The output unit 241 adjusts the strength of the output signal P3 by control of the amplification control signal P1 so that the strength of the signal transmitted from the RFID tag 101 to the RFID reader 105 (see FIG. 1) is maintained constant, regardless of a distance between the RFID tag 101 and the RFID reader 105.

The output unit 241 includes a variable amplification unit 243 and a circulator 245.

The variable amplification unit 243 inputs the signal which is output from the modulating unit 231 and the amplification control signal P1 which is output from the signal analyzing unit 223. The variable amplification unit 243 receives and amplifies the signal P3 which is output from the modulating unit 231. At this time, the variable amplification unit 243 adjusts an amplification amount of the signal P3 according to the value of the amplification control signal P1. For example, if the value of the amplification control signal P1 is smaller than the value shown in Table 1, i.e., "1000", the variable amplification unit 243 reduces the amplification amount of the signal P3 and reduces the strength of the output signal P4. If the value of the amplification control signal P1 is greater than the value shown in Table 1, i.e., "1000", the variable amplification unit 243 increases the amplification amount of the signal P3 and increases the strength of the output signal P4.

The circulator 245 is connected to the variable amplification unit 243, the signal analyzing unit 223, and the antenna 211, and sets a path of signals which are input and output to and from the variable amplification unit 243, the signal analyzing unit 223, and the antenna 211. That is, the circulator 245 sends the signal which is input from the antenna 211 to the signal analyzing unit 223, and sends the signal which is input from the variable amplification unit 243 to the antenna 211.

The RFID tag 101 of the invention analyzes the control information included in the signal sent from the RFID reader 105 (see FIG. 1) and adjusts an amplification amount of the variable amplification unit 243 according to the value of the control information, so that strength of the signal P4 transmitted from the RFID tag 101 to the RFID reader 105 (see FIG. 1) is adjusted and output according to the distance between RFID reader 105 (see FIG. 1) and the RFID tag 101. That is, if the RFID reader 105 (see FIG. 1) and the RFID tag 101 are a long distance from each other, the strength of the output signal P4 of the RFID tag 101 is increased. If the RFID reader 105 (see FIG. 1) and the RFID tag 101 are a short distance from each other, the strength of the output signal P4 of the RFID tag 101 is reduced. Accordingly, the strength of the signal transmitted from the RFID tag 101 to the RFID reader 105 (see FIG. 1) is always constant.

Figure 3:
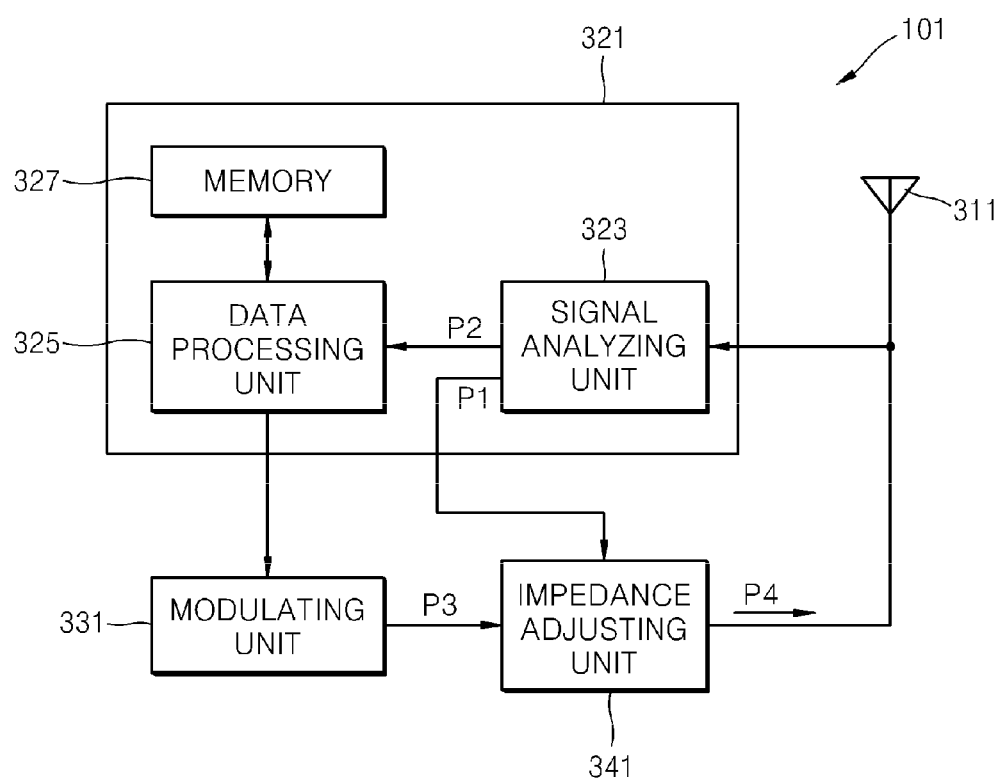
FIG. 3 is a block diagram of an RFID tag of FIG. 1 according to another embodiment of the invention.

FIG. 3 is a block diagram of an RFID tag 101 of FIG. 1 according to another embodiment of the invention. Referring to FIG. 3, the RFID tag 101 includes an antenna 311, a logic unit 321, a modulating unit 331, and an impedance adjusting unit 341.

The antenna 311 receives a signal sent from the RFID reader 105 (see FIG. 1) wirelessly, sends the signal to the logic unit 321, and sends a signal sent from the impedance adjusting unit 341 to the RFID reader 105 (see FIG. 1) wirelessly.

The logic unit 321 is connected to the antenna 311, the modulating unit 331, and the impedance adjusting unit 341. The logic unit 321 inputs a signal sent from the impedance adjusting unit 341, outputs output signals P1 and P2, and sends the output signals P1 and P2 to the impedance adjusting unit 341 and the modulating unit 331, respectively. The logic unit 321 includes a signal analyzing unit 323, a data processing unit 325, and a memory 327.

A signal analyzing unit 323 receives a signal sent from the antenna 311, and extracts and analyzes control information included in the signal. Then, the signal analyzing unit 323 outputs an analysis result as an amplification control signal P1 and sends the amplification control signal P1 to the impedance adjusting unit 341. The signal sent from the antenna 311 includes the control information and general information. Accordingly, the signal analyzing unit 323 outputs the general information as the output signal P2, and sends the output signal P2 to the data processing unit 325.

The data processing unit 325 receives the output signal P2 sent from the signal analyzing unit 323, extracts information stored in the memory 327, and sends the information to the modulating unit 331.

The memory 327 stores data. The data includes specific information about, for example, nationality of a product to which the RFID tag 101 is attached, origin, price, manufacturing date, expiration date thereof, etc.

The modulating unit 331 is connected to the logic unit 321 and the impedance adjusting unit 341. The modulating unit 331 receives a signal which is output from the logic unit 321, modulates the signal, outputs the modulated signal P3, and sends the modulated signal P3 to the impedance adjusting unit 341. The modulating unit 331 may use a frequency modulation 0 (FM0) method in order to modulate the signal (P3). The FM0 method, which is defined by an ISO/IEC 18000-6 standard, is a common modulation method used in a response signal transmitted from the RFID tag 101 to the RFID reader 105 (see FIG. 1). The FM0 method has three types of A, B, and C. The types A and B must use only FM0, and the type C uses the FM0 or a miller subcarrier. The FM0 is easy to use because data and waveform of the FM0 are simpler than those of the miller subcarrier.

The impedance adjusting unit 341, that is an output unit, inputs the amplification control signal P1 which is output from the signal analyzing unit 323 and the output signal P3 which is output from the modulating unit 331, and adjusts and outputs the strength of the output signal P3 according to the value of the amplification control signal P1. The impedance adjusting unit 341 adjusts the strength of the output signal P4 by adjusting internal impedance. That is, if the value of the amplification control signal P1 is in the range of "0001-0111", as shown in Table 1, since the RFID reader 105 (see FIG. 1) and the RFID tag 101 are a short distance from each other, the strength of the signal P4 which is output from the impedance adjusting unit 341 is reduced. Alternately, if the value of the amplification control signal P1 is in the range of "1001-1111", as shown Table 1, since the RFID reader 105 (see FIG. 1) and the RFID tag 101 are a long distance from each other, the strength of the signal P4 which is output from the impedance adjusting unit 341 is maintained at a highest level.

The RFID tag 101 of the present embodiment adjusts and outputs the strength of the signal P4 transmitted from the impedance adjusting unit 341 to the RFID reader 105 (see FIG. 1) according to the value of the control information included in the signal transmitted from the RFID reader 105 (see FIG. 1). In more detail, if the RFID tag 101 and the RFID reader 105 (see FIG. 1) are a short distance from each other, the impedance adjusting unit 341 reduces and outputs the strength of the output signal P4, and, if the RFID tag 101 and the RFID reader 105 (see FIG. 1) are a long distance from each other, the impedance adjusting unit 341 maintains and outputs the strength of the output signal P4 at the highest level.

Accordingly, the strength of the signal transmitted from the RFID tag 101 to the RFID reader 105 (see FIG. 1) is always maintained constant, regardless of the distance between the RFID tag 101 and the RFID reader 105 (see FIG. 1).

Figure 4:
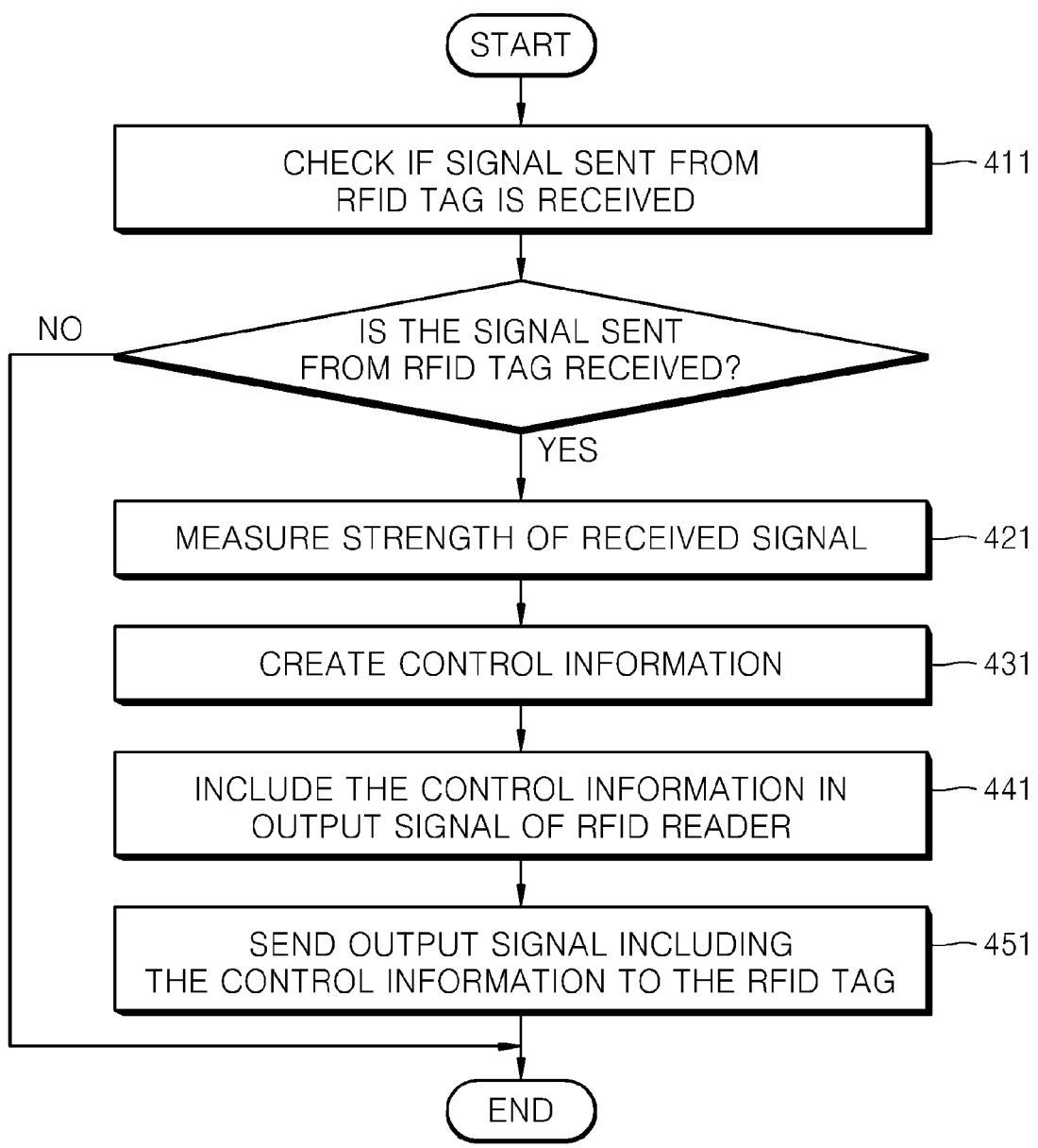
FIG. 4 is a flowchart of a communication method performed by an RFID system according to an embodiment of the invention.

FIG. 4 is a flowchart of a communication method performed by the RFID system 100 of FIG. 1 according to an embodiment of the invention. Referring to FIG. 4, the communication method performed by the RFID system 100 includes Operations 411 through 451. The communication method performed by the RFID system 100 of the present embodiment will be described with reference to FIG. 1.

In Operation 411, the RFID reader 105 checks if a signal sent from the RFID tag 101 is received or not. If the signal is received, the RFID reader 105 proceeds to a next operation, and if not, the RFID reader 105 does not proceed to the next operation.

In Operation 421, if the RFID reader 105 receives the signal sent from the RFID tag 101, the RFID reader 105 measures the strength of the received signal. In order to measure the strength of the received signal, the RFID reader 105 may use a received signal strength indication (RSSI) calculator.

In Operation 431, the RFID reader 105 creates control information as shown in Table 1, according to a measurement result.

In Operation 441, the RFID reader 105 includes the control information in an output signal of the RFID reader 105.

In Operation 451, the RFID reader 105 sends the output signal of the RFID reader 105 including the control information to the RFID tag 101.

Figure 5:
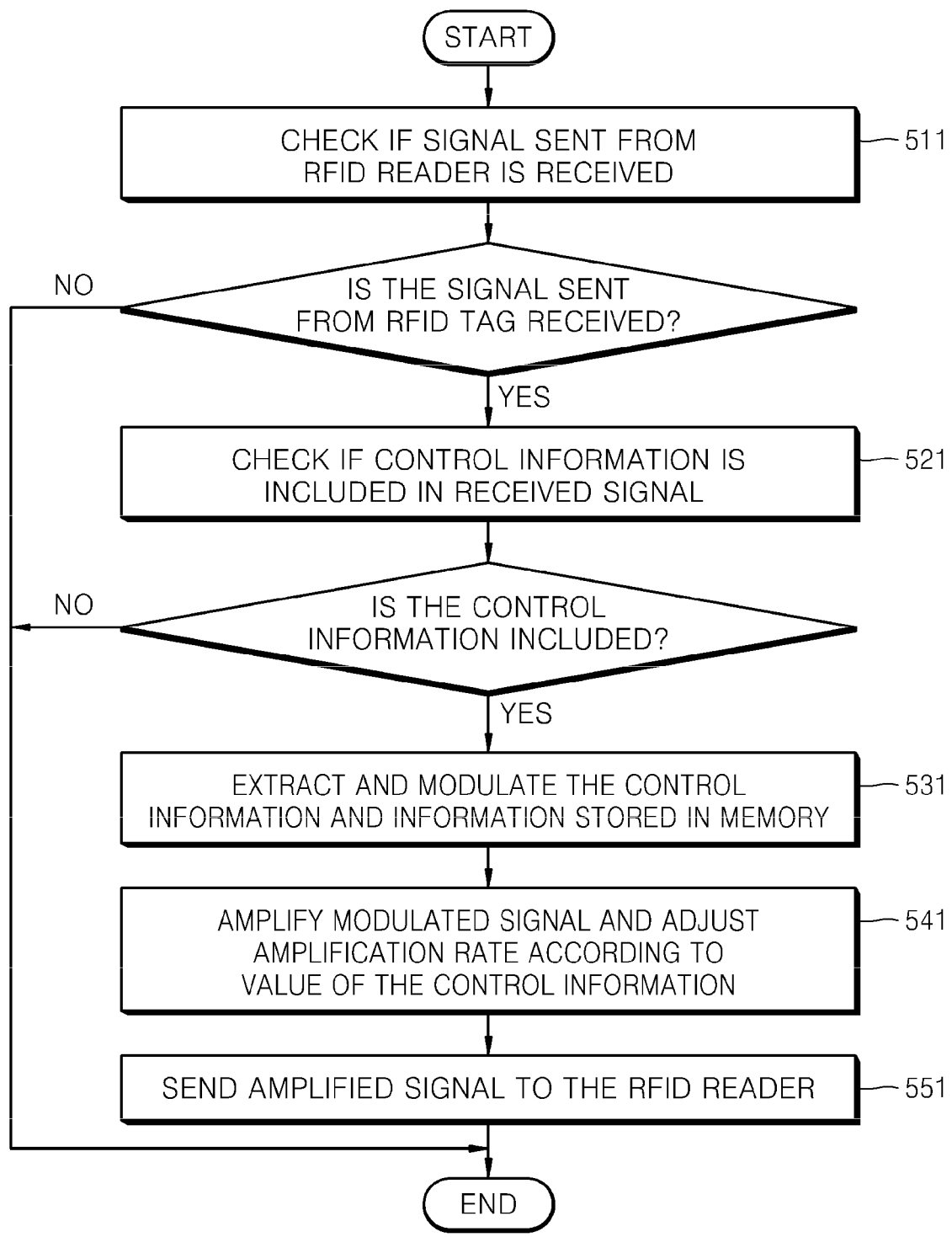
FIG. 5 is a flowchart of a communication method performed by an RFID system according to another embodiment of the invention.

FIG. 5 is a flowchart of a communication method of the RFID system 100 of FIG. 1 according to another embodiment of the invention. Referring to FIG. 5, the communication method performed by the RFID system 100 (see FIG. 1) includes Operations 511 through 551. The communication method of the RFID system 100 (see FIG. 1) illustrated in FIG. 5 will be described with reference to FIG. 1.

In Operation 511, the RFID tag 101 checks if a signal sent from the RFID reader 105 is received or not. If the signal is received, the RFID reader 105 proceeds to a next operation, and if not, the RFID reader 105 does not proceed to the next operation.

In Operation 521, if the RFID tag 101 receives the signal sent from the RFID reader 105, the RFID tag 101 checks if the control information is included in the received signal.

In Operation 531, if the control information is included in the received signal, the RFID tag 101 extracts a value of the control information. The RFID tag 101 extracts information stored in the memory 227 of FIG. 2 or the memory 327 of FIG. 3 in response to the received signal and modulates the information. If the control information is not included in the received signal, the RFID tag 101 creates an error signal and stops all the operations.

In Operation 541, the RFID tag 101 amplifies the modulated signal and adjusts an amplification amount of the modulated signal according to the value of the control information. That is, as shown in Table 1, if the value of the control information is great due to the long distance between the RFID reader 105 and the RFID tag 101, the RFID tag 101 increases the amplification amount of the modulated signal or maintains it at the highest level. If the value of the control information is small due to the short distance between the RFID reader 105 and the RFID tag 101, the RFID tag 101 reduces the amplification amount of the modulated signal.

In Operation 551, the RFID tag 101 sends the amplified and output signal to the RFID reader 105.

As illustrated in FIGS. 4 and 5, the RFID reader 105 measures strength of the signal sent from the RFID tag 101, creates control information according to a measurement result to include the control information in an output signal of the RFID reader 105, and sends the control information to the RFID tag 101. The RFID tag 101 adjusts and outputs an amplification amount of the output signal of the RFID tag 101 according to the value of the control information included in the signal sent from the RFID reader 105.

Accordingly, the strength of the signal transmitted from the RFID tag 101 to the RFID reader 105 is always maintained constant, regardless of the distance between the RFID tag 101 and the RFID reader 105.

Figure 6:
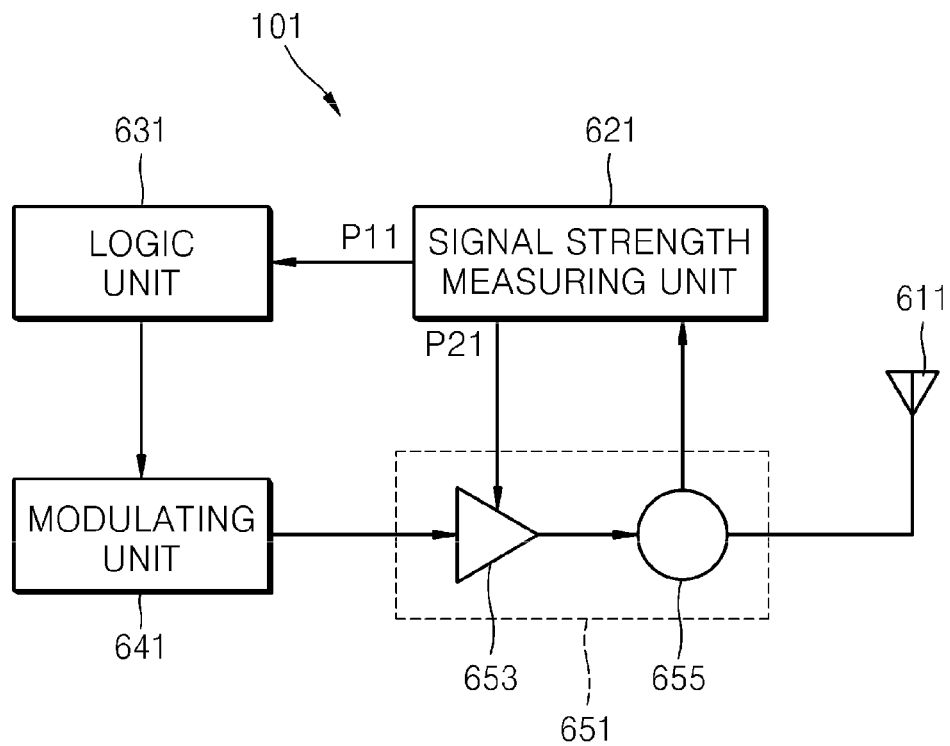
FIG. 6 is a block diagram of the RFID tag of FIG. 1 according to another embodiment of the invention.

FIG. 6 is a block diagram of the RFID tag of FIG. 1 according to another embodiment of the invention. Referring to FIG. 6, an RFID tag 101 includes an antenna 611, a signal strength measuring unit 621, a logic unit 631, a modulating unit 641, and an output unit 651.

The antenna 611 receives a signal from the RFID reader 105 (see FIG. 1) wirelessly, sends the signal to the circulator 655, and transmits a signal sent from the circulator 655 to the RFID reader 105 (see FIG. 1) wirelessly.

The signal strength measuring unit 621 is connected to the circulator 655, the logic unit 631, and a variable amplification unit 653. The signal strength measuring unit 621 inputs the signal sent from the circulator 655, outputs output signals P11 and P21, and sends the output signals P11 and P21 to the logic unit 631 and the variable amplification unit 653. That is, the signal strength measuring unit 621 receives the signal from the circulator 655, outputs the signal, and sends the signal to the logic unit 631. The signal strength measuring unit 621 measures strength of the signal which is output from the circulator 655 and outputs the strength control signal P21 including a value of a measurement result, and sends the strength control signal P21 to the variable amplification unit 653. At this time, if the strength of the signal which is output from the circulator 655 is greater than a predetermined value, the strength control signal P21 has a high level voltage. If the strength of the signal which is output from the circulator 655 is lower than the predetermined value, the strength control signal P21 has a low level voltage. Alternately, if the strength of the signal which is output from the circulator 655 is greater than the predetermined value, the strength control signal P21 has a low level voltage, and, if the strength of the signal which is output from the circulator 655 is lower than the predetermined value, the strength control signal P21 has a high level voltage.

The logic unit 631 includes a memory that stores specific information about, for example, nationality of a product to which the RFID tag 101 is attached, origin, price, manufacturing date, expiration date thereof, etc. The logic unit 631 receives a signal from the signal strength measuring unit 621, extracts the specific information stored in the memory, and sends the information to the modulating unit 641.

The modulating unit 641 is connected to the logic unit 631 and the variable amplification unit 653. The modulating unit 641 receives a signal from the logic unit 631, modulates the signal, and sends the signal to the variable amplification unit 653. The modulating unit 641 may use frequency modulation 0 (FM0) in order to modulate the input signal. The FM0, which is defined by the ISO/IEC 18000-6 standard, is a common modulation method used in a response signal transmitted from the RFID tag 101 to the RFID reader 105 (see FIG. 1). The FM0 has three types of A, B, and C. The types A and B must use only FM0, and the type C uses the FM0 or a miller subcarrier. The FM0 is easily used because data and waveform of the FM0 are simpler than those of the miller subcarrier.

The output unit 651 inputs the strength control signal P21 which is output from the signal strength measuring unit 621 and a signal which is output from the modulating unit 641, adjusts the magnitude of the signal which is output from the modulating unit 641 according to the strength control signal P21, and sends the signal to the antenna 611.

The output unit 651 includes the variable amplification unit 653 and the circulator 655.

The variable amplification unit 653 inputs a signal which is output from the modulating unit 641 and the strength control signal P21 which is output from the strength control signal P21. The variable amplification unit 653 receives the signal from the modulating unit 641 and amplifies the signal. At this time, the variable amplification unit 653 adjusts an amplification amount of the signal according to the value of the strength control signal P21, and creates an output signal. For example, if the strength control signal P21 has a low level voltage, the variable amplification unit 653 reduces the amplification amount to reduce the strength of the output signal. If the strength control signal P21 has a high level voltage, the variable amplification unit 653 increases the amplification amount to increase the strength of the output signal.

The circulator 655 is connected to the variable amplification unit 653, the signal strength measuring unit 621, and the antenna 611, and sets a path of input and output signals between the variable amplification unit 653, the signal strength measuring unit 621, and the antenna 611. That is, the circulator 655 sends the signal which is input from the antenna 611 to the signal strength measuring unit 621, and sends the signal which is input from the variable amplification unit 653 to the antenna 611.

The RFID tag 101 of the present embodiment in FIG. 6 includes the signal strength measuring unit 621 and the variable amplification unit 653. The signal strength measuring unit 621 measures the strength of the signal received through the antenna 611 and outputs the strength control signal P21 according to the measurement result. The variable amplification unit 653 adjusts and outputs the strength of the input signal according to the strength control signal P21. Accordingly, the RFID tag 101 transmits the signal, to RFID reader 105 (see FIG. 1), having the strength adjusted according to the distance between the RFID tag 101 to RFID reader 105 (see FIG. 1).

Figure 7:
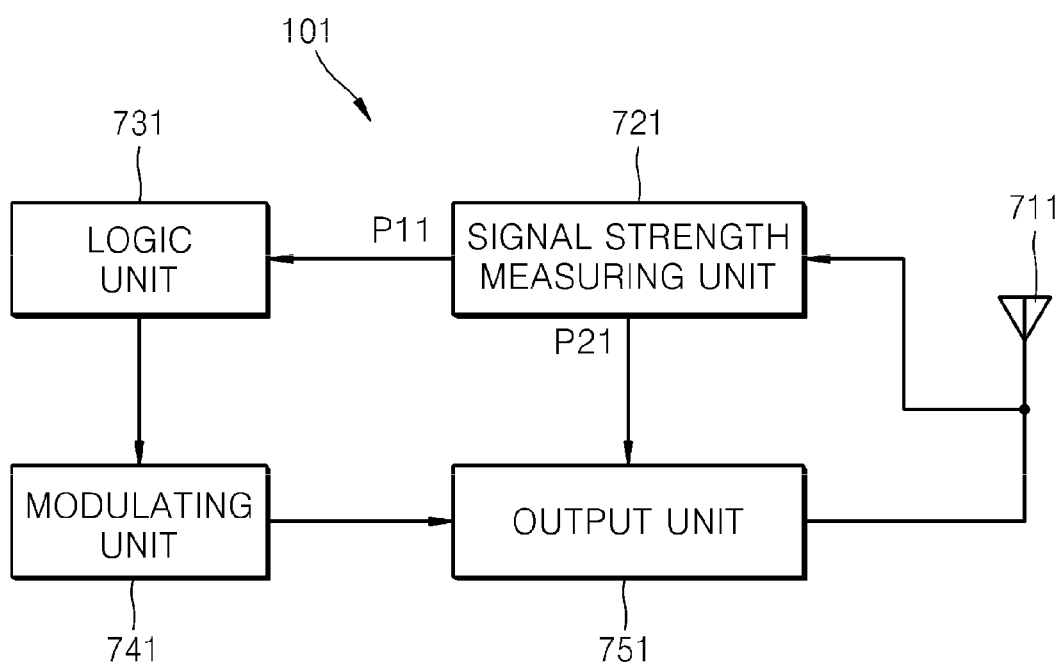
FIG. 7 is a block diagram of the RFID tag of FIG. 1 according to another embodiment of the invention.

FIG. 7 is a block diagram of the RFID tag of FIG. 1 according to another embodiment of the invention. Referring to FIG. 7, the RFID tag 101 includes an antenna 711, a signal strength measuring unit 721, a logic unit 731, a modulating unit 741, and an output unit 751.

The antenna 711 receives a signal from the RFID reader 105 (see FIG. 1) wirelessly, transmits the signal to the signal strength measuring unit 721, and sends a signal sent from the output unit 751 to the RFID reader 105 (see FIG. 1) wirelessly.

The signal strength measuring unit 721 is connected to the antenna 711, the output unit 751, and the logic unit 731. The signal strength measuring unit 721 inputs a signal via the antenna 711 and sends the signal as an output signal P11 to the logic unit 731. The signal strength measuring unit 721 measures the strength of the signal via the antenna 711, outputs the strength control signal P21 having a value according to a measurement result, and sends the strength control signal P21 to the output unit 751. That is, if the strength of the signal which is input via the antenna 711 is greater than a predetermined value, the strength control signal P21 has a high level voltage. If the strength of the signal which is input via the antenna 711 is lower than the predetermined value, the strength control signal P21 has a low level voltage. To the contrary, if the strength of the signal which is input via the antenna 711 is greater than the predetermined value, the strength control signal P21 has a low level voltage, and if the strength of the signal which is input via the antenna 711 is lower than the predetermined value, the strength control signal P21 has a high level voltage.

The logic unit 731 includes a memory that stores specific information about, for example, nationality of a product to which the RFID tag 101 is attached, origin, price, manufacturing date, expiration date thereof, etc. The logic unit 731 receives a signal from the signal strength measuring unit 721, extracts the specific information stored in the memory, and sends the information to the modulating unit 741.

The modulating unit 741 is connected to the logic unit 731 and the output unit 751. The modulating unit 741 receives a signal from the logic unit 731, modulates the signal, and sends the signal to the output unit 751. The modulating unit 741 may use FM0 in order to modulate the input signal. The FM0, which is defined by the ISO/IEC 18000-6 standard, is a common modulation method used in a response signal transmitted from the RFID tag 101 to the RFID reader 105 (see FIG. 1). The FM0 has three types of A, B, and C. The types A and B must use only FM0, and the type C uses the FM0 or a miller subcarrier. The FM0 is easily used because data and waveform of the FM0 are simpler than those of the miller subcarrier.

The output unit 751 inputs the strength control signal P21 which is output from the signal strength measuring unit 721 and a signal which is output from the modulating unit 741, adjusts the magnitude of the signal which is output from the modulating unit 741 in response to the strength control signal P21, and sends the signal to the antenna 711. The output unit 751 includes an impedance adjusting unit for adjusting internal impedance to adjust the strength of the input signal.

As described above, the RFID tag 101 of the invention in FIG. 7 includes the signal strength measuring unit 721 and the output unit 751. The signal strength measuring unit 721 measures the strength of the signal received through the antenna 711, outputs the strength control signal P21 in response to the measurement result. The output unit 751 adjusts the strength of the input signal according to the strength control signal. Accordingly, the RFID tag 101 transmits the signal to RFID reader 105 (see FIG. 1) in which the signal is adjusted according to the magnitude of RF power according to the distance between the RFID tag 101 to RFID reader 105 (see FIG. 1).

The RFID tag 101 and the RFID reader 105 (see FIG. 1) constitute an RFID system. The RFID tag 101 is attached to an object and stores identification (ID) of the object. The RFID reader 105 identifies the RFID tag 101, and writes or reads additional information to or from the RFID tag 101.

Communication between the RFID reader 105 (see FIG. 1) and the RFID tag 101 uses various international standards of communication, such as data encoding, modulation, collision prevention, data decoding, and demodulation. At present, the EPC Class 1 Generation 2[3] has been registered in the ISO/IEC, and its range of use has been internationally increased.

The RFID tag 101 of the current embodiment is based on the operation of the RFID system 100 according to the EPC Class 1 Generation 2[3] standard. However, the invention is not limited thereto, and the RFID tag 101 may be operated by using various international standards of communication, such as data encoding, modulation, collision prevention, data decoding, demodulation, etc.

FIG. 8 is a flowchart of a method of operating an RFID tag according to an embodiment of the invention. Referring to FIG. 8, the method of operating the RFID tag 101 (see FIGS. 6 and 7) of the invention includes Operations 811 through 871. The method of operating the RFID tag 101 illustrated in FIG. 8 will be described with reference to FIGS. 6 and 7.

In Operation 811, the signal strength measuring unit 621 or 721 receives a signal via the antenna 611 or 711. The signal received via the antenna 611 or 711 is a signal sent from the RFID reader 105 (see FIG. 1) wirelessly.

In Operation 821, the signal strength measuring unit 621 or 721 measures strength of the received signal, outputs the signal as the strength control signal P21, and sends the signal to the output unit 651 or 751. Also, the signal strength measuring unit 621 or 721 sends the received signal to the logic unit 631 or 731.

In Operation 831, if the logic unit 631 or 731 receives the signal from the signal strength measuring unit 621 or 721, the logic unit 631 or 731 extracts stored data and sends the data to the modulating unit 641 or 741.

In Operation 841, the modulating unit 641 or 741 modulates the signal which is output from the logic unit 631 or 731 and sends the modulated signal to the output unit 651 or 751.

In Operation 851, if the output unit 651 or 751 receives the modulated signal which is output from the logic unit 631 or 731, the output unit 651 or 751 adjusts the strength of the modulated signal in response to the strength control signal P21 which is output from the signal strength measuring unit 621 or 721. That is, if the strength of the signal transmitted from the RFID reader 105 (see FIG. 1) to the RFID tag 101 is low due to the long distance between RFID tag 101 and the RFID reader 105 (see FIG. 1), the RFID tag 101 increases the strength of the output signal. If the strength of the signal transmitted from the RFID reader 105 (see FIG. 1) to the RFID tag 101 is high due to the short distance between RFID tag 101 and the RFID reader 105 (see FIG. 1), the RFID tag 101 reduces the strength of the output signal.

In Operation 861, the output unit 651 or 751 compares the adjusted signal with a predetermined value.

In Operation 871, if a value of strength of the adjusted signal does not exceed the predetermined value, the output unit 651 or 751 sends the value to the RFID reader 105 (see FIG. 1) through the antenna 611 or 711. If the value of the strength of the adjusted signal exceeds the predetermined value, Operation 851 is performed.

As described above, according to the invention, the RFID tag 101 in FIGS. 6 and 7 measures the strength of the signal which is received through the antenna 611 or 711, outputs the strength control signal P21 according to the measurement result, and adjusts and outputs the strength of the signal which is output from the RFID tag 101 according to the strength control signal P21. Accordingly, the RFID tag 101 transmits the signal to the RFID reader 105 (see FIG. 1) in which the strength of the signal is adjusted according to the magnitude of RF power according to the distance between the RFID tag 101 to RFID reader 105 (see FIG. 1).

According to various embodiments of the invention, the RFID reader 105 (see FIG. 1) measures strength of a signal sent from the RFID tag 101 (see FIG. 1), creates control information according to a measurement result to include the control information in an output signal of the RFID reader 105 (see FIG. 1), and sends the control information to the RFID tag 101 (see FIG. 1). The RFID tag 101 (see FIG. 1) adjusts and outputs an amplification amount of an output signal of the RFID tag 101 (see FIG. 1) according to a value of the control information included in the signal sent from the RFID reader 105 (see FIG. 1). Accordingly, the strength of the signal transmitted from the RFID tag 101 (see FIG. 1) to the RFID reader 105 (see FIG. 1) is always maintained constant, regardless of the distance between the RFID tag 101 (see FIG. 1) and the RFID reader 105 (see FIG. 1), thereby increasing a recognition rate of the RFID reader 105 (see FIG. 1) with respect to information stored in the RFID tag 101 (see FIG. 1).

The system or systems may be implemented on any form of computer or computers, and can include functional programs, codes, and code segments. Any of the computers may comprise a processor, a memory for storing program data and executing it, a permanent storage such as a disk drive, a communications port for handling communications with external devices, and user interface devices, including a display, keyboard, mouse, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. This media can be read by the computer, stored in the memory, and executed by the processor.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context.

Numerous modifications and adaptations will be readily apparent to those skilled in this art without departing from the spirit and scope of the invention.

What is claimed is:

1. A radio frequency identification (RFID) system comprising:
   an RFID tag; and
   an RFID reader having a signal strength measurer that measures a strength of a signal received from the RFID tag, the RFID reader is configured to create control information used to set an amplification amount of the RFID tag using a value of the measured strength, include the control information in a first output signal, and send the first output signal to the RFID tag;
   wherein the RFID tag, if the signal sent from the RFID reader is received, extracts internal information in response to the received signal, sends the information to the RFID reader as a second output signal, extracts the control information included in the received signal sent from the RFID reader, and adjusts a strength of the second output signal according to a value contained within the control information, wherein
   if the strength of the signal received from the RFID tag is below a first predetermined value, the RFID reader sets the control information so that the amplification amount of the RFID tag is increased, and
   if the strength of the signal received from the RFID tag is above a second predetermined value, the RFID reader sets the control information so that the amplification amount of the RFID tag is reduced.

2. A radio frequency communication system comprising:
   a first device configured to transmit a wireless signal; and
   a second device configured to receive the wireless signal and send information to the first device by modulating the received wireless signal;
       wherein the second device sends control information including a digital value to the first device, and the first device, if the control information sent from the second device is received, extracts the digital value from the control information, and controls the transmission of the wireless signal according to the digital value contained within the control information, wherein
       if the strength of the wireless signal transmitted from the first device to the second device is below a first predetermined value, the second device sets the digital value of the control information so that the amplification amount of the first device is increased, and
       if the strength of the wireless signal transmitted from the first device to the second device is above a second predetermined value, the second device sets the digital value of the control information so that the amplification amount of the first device is reduced.

3. The radio frequency communication system of claim 2, wherein the first device adjusts a strength of the wireless signal based on the digital value.

4. The radio frequency communication system of claim 2, wherein the second device measures a strength of the received wireless signal and generates the control information based on the measured value of the strength of the received wireless signal.

5. The radio frequency communication system of claim 4, wherein the second device generates the control information by comparing the measured value and at least one predetermined target value.

6. The radio frequency communication system of claim 5, wherein when the measured value is greater than a first target value, the first device decreases the strength of the wireless signal and when the measured value is smaller than a second target value, the first device increases the strength of the wireless signal.

7. The radio frequency communication system of claim 5, wherein the control information includes an error value representing a difference between the measured value and the predetermined target value.

8. The radio frequency communication system of claim 2, wherein the first device determines whether to perform the transmission of the wireless signal according to the reception of the control information.

9. The radio frequency communication system of claim 8, wherein the control information indicates a strength of the received wireless signal.

10. The radio frequency communication system of claim 8, wherein when the first device receives the control information the first device transmits the wireless signal, and when the first device does not receive the control information the first device does not transmit the wireless signal.

11. The radio frequency communication system of claim 2, wherein the second device sends identification information to the first device.

12. The radio frequency communication system of claim 11, wherein the identification information identifies the second device.

13. The radio frequency communication system of claim 11, wherein the second device sends optional information to the first device.

14. The radio frequency communication system of claim 13, wherein the optional information includes at least one of nationality information, origin information, price information, manufacturing information and expiring information.

* * * * *